Figure 1:
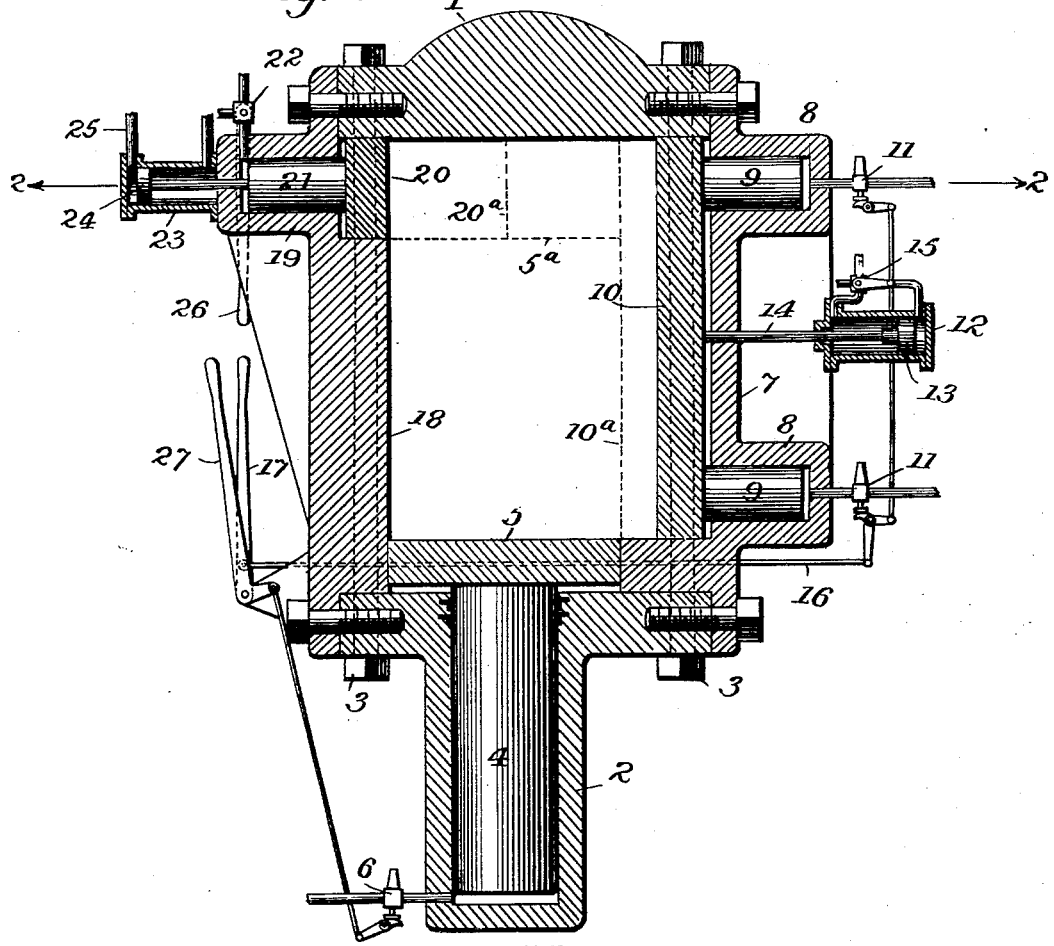

No. 677,148. Patented June 25, 1901.
S. J. WEBB.
METHOD OF COMPRESSING BALES WITHOUT REMOVING THE BANDS.
(Application filed Nov. 16, 1900.)

(No Model.) 2 Sheets—Sheet 1.

Witnesses
J. C. Hinkel
Arthur Gillman Jr.

Inventor
Samuel J. Webb
By Foster Freeman
Attorneys

THE NORRIS PETERS CO., PHOTO-LITHO., WASHINGTON, D. C.

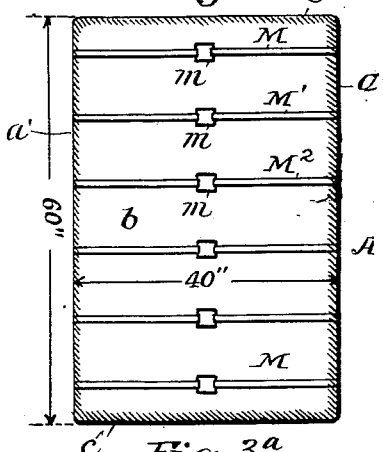
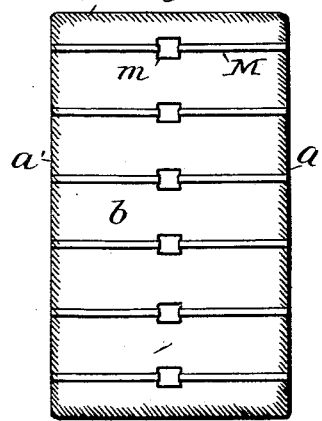
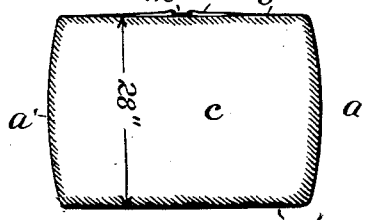
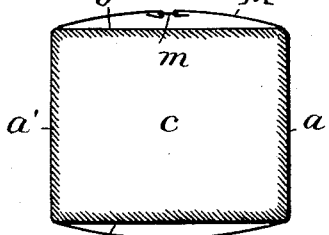
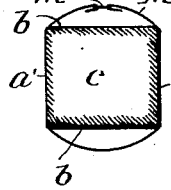
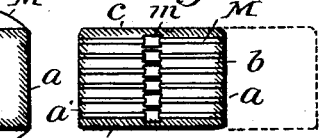
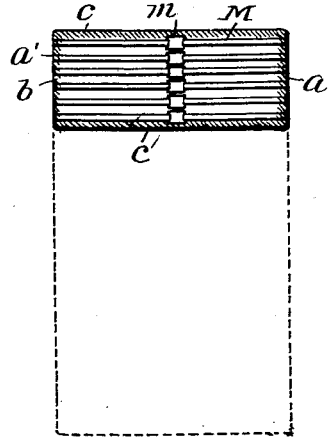
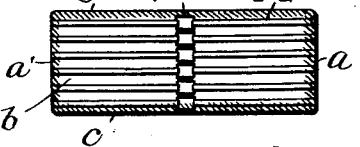
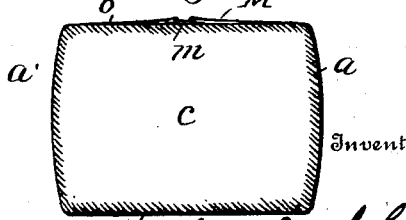
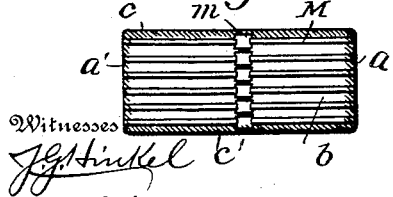

United States Patent Office.

SAMUEL J. WEBB, OF MINDEN, LOUISIANA.

METHOD OF COMPRESSING BALES WITHOUT REMOVING THE BANDS.

SPECIFICATION forming part of Letters Patent No. 677,148, dated June 25, 1901.

Application filed November 16, 1900. Serial No. 36,741. (No specimens.)

*To all whom it may concern:*

Be it known that I, SAMUEL J. WEBB, a citizen of the United States, residing at Minden, in the parish of Webster and State of Louisiana, have invented certain new and useful Improvements in Methods of Compressing Bales Without Removing the Bands, of which the following is a specification.

My invention relates to a new and improved method of compressing cotton and similar materials with the view of increasing the density of the cotton and decreasing the size of the bale; and to this end my invention consists in the method of manipulating the bale, substantially as hereinafter more particularly set forth.

One of the distinguishing features of my improved method of compressing bales of cotton or other material consists in compressing the bale without first removing the ordinary bands or ties confining the bale, the bands or ties remaining buckled or tied throughout the manipulations on the bale, so that the compressed bale is confined and held by the same bands or ties that were originally applied to the bale.

Generally stated, the improved method consists in taking a bale (and if it is a bale of cotton it may be a country or plantation bale, or even a compressed bale) which, as usual, is banded or tied, and without removing the bands or ties the bale is confined against expansion in the direction of the last pressure. Thus the bale, with the bands intact, may be placed in a suitable press having proper means for preventing lateral expansion, or expansion in the direction of the last pressure, or, which is a preferable way, the bale, with the bands intact, is placed in a proper press and is subjected to pressure in the direction of its last pressure, this pressure being relatively small, but being sufficient to loosen the bands or relieve the strain upon them and to prevent expansion of the cotton in the direction of the last pressure on the bale, and the bale is retained under such pressure and affords a support for the bands or ties and prevents accidental breaking thereof. Whichever way the bale is treated in the first instance it is confined against lateral expansion in the direction of its last pressure, the bale being surrounded by the bands or ties originally applied. The bale thus confined or retained against expansion, or even under more or less pressure and against expansion, is then compressed longitudinally, or in the direction of its length. After this compression it is confined or retained in such compressed form and is then compressed in the direction in which it is banded—that is, in a direction which is parallel with the bands. The principal object of this compression is to change the direction of expansion, and after it has thus been compressed the pressure on the bale in this direction is released, and the bale expands in the direction in which it was banded and fills the bands. In this way the bands which were originally applied to the bale are utilized in confining the compressed bale, but the bale has been reduced largely as to its longitudinal dimension and is much shorter, and the bands or ties are much nearer together than they were in the bale before it was compressed by my process.

Figure 2:
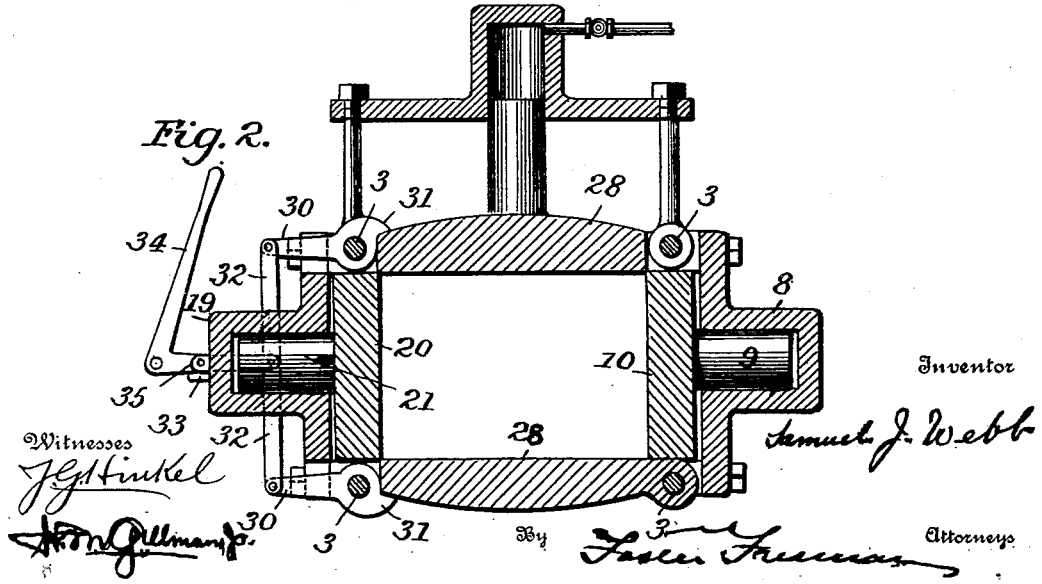

Referring to the accompanying drawings, wherein I have illustrated and shall briefly describe an apparatus by means of which my improved method can be carried out, Figure 1 is a vertical section of a press. Fig. 2 is a horizontal cross-section of Fig. 1 on the line 2 2. Fig. 3 is a side view of a plantation-bale, and Fig. 3ª is an end view thereof. Figs. 4 and 4ª are similar views of a bale with the tension removed from the bands. Figs. 5 and 5ª are plan views of a bale compressed to bring the bands closer together. Figs. 6 and 6ª are plan and end views, respectively, of a bale compressed to change the direction of expansion. Figs. 7 and 7ª are plan and end views, respectively, of a compressed and expanded bale.

In any of the ordinary methods of compressing a bale of material—such, for instance, as cotton—as heretofore practiced it has been necessary to remove the bands or ties by which it was originally banded and to reband or tie the bale after it is compressed. This operation involves a considerable loss of time and much labor and expense; and one of the main objects of my invention is to avoid these objectionable features and at the same time produce a compressed bale in which the density of the material is largely increased, while of course its bulk is correspondingly decreased, and, furthermore, the bales are reduced to practically uniform dimensions.

It is well known that a bale, especially of cotton, after being pressed in one direction tends to expand in the direction or line of such pressure. Thus, for instance, if a bale is pressed by applying pressure to the top and bottom of the bale when that pressure is released the bale tends to and will expand to practically its original size. When a bale is being compressed in the direction of one of its dimensions, there is little tendency to expand in a direction transverse to the direction of compression; but this tendency in the original compression of the bale is relatively very small. If, however, after the bale has been compressed in the direction of one of its dimensions and it is then compressed in the direction of another of its dimensions, there is more tendency to expand in the direction of its first pressure while receiving its second compression, although this tendency is not as great as it is to expand in the direction of the last compression when it is released from such pressure.

To illustrate this general statement more particularly, in Fig. 3, A represents a side view of an ordinary plantation or country bale with the bands surrounding it and secured in place, and Fig. 3ª is an end view of such a bale. This bale is assumed to have been subjected to pressure, as by a farm or plantation press on the top and bottom $a\ a'$, and while being so pressed there was more or less tendency to expand at the sides $b\ b'$, and even at its ends $c\ c'$; but this tendency was relatively small and is usually overcome by confining the cotton in a bale-box while being subjected to this pressure. When the pressure was released, the tendency of the bale was to expand toward its top and bottom $a\ a'$, and it is secured against such expansion by the bands M M', &c., which are tied by buckles or ties $m$. If now the bale is again subjected to pressure in a line passing through its top and bottom $a\ a'$, there is little or no tendency to expand in the direction of its sides or length; but if it is subjected to pressure in a direction transverse to its first line of pressure—that is, either through its sides $b\ b'$ or its ends $c\ c'$—there is a considerably greater tendency to expand in the direction of its top and bottom $a\ a'$, and it is necessary to confine the bale against such expansion when it is being compressed in a second direction transverse to the first. Thus, for instance, as in my present invention, if the bale is subjected to pressure on its ends $c\ c'$ it must be confined against expansion in the direction of its top and bottom $a\ a'$; but when the pressure is released from the ends there is a much greater tendency to expand in the line of such pressure—that is, toward the ends outwardly than toward its top or bottom—or, in other words, the greatest tendency to expand is in the direction of the last pressure. It follows, therefore, that the tendency to expand may be changed by changing the direction of compression, and I make use of this fact in carrying out my present method.

Referring now to Figs. 1 and 2, in which I have indicated a construction of press by means of which my improved method can be carried out, 1 represents a stationary platen, to which is attached a hydraulic cylinder 2 by suitable means, as the bolts or rods 3, and mounted on any suitable base and moving in the hydraulic cylinder 2 is a plunger 4, having a movable platen 5, and there is a suitable inlet and outlet valve 6, controlling the supply of motor fluid to the cylinder 2. Connected to the stationary platen and hydraulic cylinder or otherwise supported is a plate or frame 7, having one or more cylinders 8 8, in which move plungers 9 9, connected to a platen 10, and suitable valves 11 11 are provided to control the flow of fluid to the cylinder or cylinders 8, and some sort of means is preferably provided for directly operating the platen 10—as, for instance, a steam-cylinder 12, in which moves a piston 13, connected by rod 14 with the platen 10. A suitable valve—in this instance a four-way valve 15—controls the flow of steam to the cylinder 12, and when this steam-cylinder is used for actuating the platen 10 the cylinders 8 8 are utilized simply as retaining-cylinders, and in this instance the valves 11 are check-valves. These cylinders 8 8, however, may of course be used as operating-cylinders and the steam-cylinder dispensed with or used simply to return the platen to its normal position. These valves 11 and 15 may be controlled by a single mechanism, as the rod 16 and handle 17, or by any other suitable or well-known means.

Mounted on or connected to the stationary platen and hydraulic cylinder 2 is a head or plate 18, which in this instance is provided with a hydraulic cylinder 19, in which moves a plunger 21, carrying a movable platen 20. This cylinder is provided with a suitable inlet-valve 22. This plunger 21 must be returned to its normal position by some suitable means—as, for instance, a steam-cylinder 23 and piston 24, which is operated by a motor fluid from some suitable source of supply through the pipe 25. The valve 22 may be operated in any suitable way, as by the handle 26, and another handle 27 through proper connections may control the valve 6.

In some instances it is desirable to use means for confining the bale against side expansion, and I therefore provide one or more side doors 28, which may be hinged to the rods or bolts 3 or other suitable part of the frame an may be locked in position by any suitable means. I have shown in the present instance swinging arms 30, having projections 31 adapted to engage the free edges of the doors 28 and to be moved into locking position by any suitable means—for instance, the toggle-links 32 and 33, one of the latter being provided with a suitable handle 34, and there preferably being provided a stop 35. The doors 28 may be moved into and out of position by hand or by operating mechanism.

I will now describe more particularly the various steps involved in carrying out my method of operation and for convenience will refer to the parts indicated in the drawings.

It will be understood that my method may be applied either to plantation-bales or compressed bales; but for convenience of illustration I will describe it as applied to a plantation-bale. Thus let it be assumed that A, Fig. 3, represents such a plantation-bale, which, for instance, is forty inches high—that is, between the top and bottom $a\ a'$—twenty-eight inches wide—that is, between the sides $b\ b'$—and sixty inches long between the ends $c\ c'$, and that there are six bands M $M^5$, applied and fastened in the usual way by the ties $m$. This bale when the press illustrated is used is placed with one of its ends resting on the platen 5 and with its top and bottom adjacent the faces of the platens 10 and 20, and its other end of course will be adjacent to the face of the stationary platen 1.

It is desirable, if not indeed necessary, to confine the bale against expansion in the direction of its last pressure—that is, in the direction in which it was subjected to pressure by the plantation-press—so as to overcome the tendency to expand in the direction of the last pressure when it is compressed in a direction transverse thereto, and it is also desirable to support the bands in the direction of the last pressure on the bale and in order to prevent their breaking under expansion of the bale. To do this, the platen 10 is moved to the position indicated by the dotted line $10^a$, and this will press the top and bottom $a\ a'$ of the bale more or less, depending upon its exact height, and will release the tension on the bands and support them while the bale is being compressed, as hereinafter stated. This condition of the bale is indicated in Figs. 4 and $4^a$, in which the height of the bale has been reduced sufficiently to release the pressure on the bands, and the bands may be loose at the sides, as indicated at M, Fig. $4^a$, the drawing being exaggerated for the purpose of illustration. This pressure on the top and bottom of the bale may reduce the height of the bale a few inches more or less; but all that is necessary is to support the top and bottom of the bale sufficiently to confine it against expansion and prevent the breaking of the bands while being compressed in a transverse direction, as described. The bale being thus confined against expansion, the platen 5 is operated, compressing the bale in the direction of its length $c\ c'$ or in a direction transverse to that in which it was banded, and thus, for instance, the platen 5 may be moved to the position indicated by the dotted line $5^a$, and in so doing the bands will be moved with the cotton and will assume positions relatively near to each other, as indicated in Figs. 5 and $5^a$.

The bale being subjected to great pressure by the platen 5, on release of the pressure it would tend to expand in the direction of such last pressure—that is, lengthwise—and if it were now released from pressure the advantages of my method of operation would be to a great extent overcome. In order to avoid this, I make use of the discovery above announced that the bale will always tend to expand to the greatest extent in the direction of the last pressure, and I then proceed to subject the bale to further pressure in a direction transverse to this last pressure for the purpose of changing the direction of its tendency to expand. It is necessary, of course, that the bale be confined against expansion in the direction of this longitudinal pressure while it is receiving its next pressure, and consequently the platen 5 is retained in its position of compression—as shown, for instance, by dotted line $5^a$—so as to confine the bale while the platen 20 is operated, compressing the bale in the direction in which it is banded, which in this case is the direction of its first pressure. Thus the platen 20 may be moved to dotted line $20^a$, the bands expanding or bulging outward at the sides, as indicated in Fig. $6^a$, and the bale assuming the height indicated in the full lines, Fig. 6. If now the bale is released from all pressure, (preferably from the pressure on its top and bottom,) first it will expand in the direction of the last pressure and against the bands, and it will be in the form substantially indicated in Figs. 7 and $7^a$, and the bands that were originally applied will form the confining-bands of the bale, but their positions with relation to each other will be changed, in that they will be much more nearly together. In this way it is possible to remove a portion of the bands of the original plantation-bale. For instance, I have found it practicable to remove two or more of the bands, and thereby save the cost thereof.

It will be observed that the dimensions of the completed bale are changed only in one direction—that is, in the direction of its length—its height $a\ a'$ remaining, as before, practically forty inches, its width $b\ b'$ being practically twenty-eight inches; but its length $c\ c'$ is reduced from sixty inches to twelve to eighteen inches, depending, of course, upon the amount of pressure to which it is subjected and other well-known considerations, and the density of this bale is manifestly greatly increased. It is also manifest that this method of operation results in a great saving of manual labor and in an increased speed in compressing bales.

In some cases it is not necessary to put the top and bottom of the bale under any amount of pressure, but simply to support the bale in this direction against expansion, and if the press indicated in Figs. 1 and 2 is used the platen 10 may remain substantially in the position indicated at the dotted line 10ª, or if this method is pursued instead of a moving platen 10 a stationary plate would be sufficient to carry out the operation. Further, in some instances it is also desirable to confine four of the sides of the bale against expansion not only in the direction of the last pressure, but in a direction transverse thereto, and when this is desirable the side doors 28 may be utilized, and one of these doors may be stationary and the other movable to receive the bale, and they need not exert any particular pressure upon the bale in their normal condition of closure, but only act to prevent any expansion of the bale in the direction opposed by the doors, and these doors may further be utilized in shaping the bale or causing it to retain its shape, so that all the bales will be of substantially uniform dimensions.

While I have thus described my method as applied to an ordinary plantation-bale, it is evident that the same principles of operation and the same general steps may be carried out in recompressing a compressed bale, and I do not deem it necessary to describe them in detail.

The apparatus, which is generally indicated in the drawings, is not claimed herein, as that will form the subject-matter of another application.

What I do claim is—

1. The method substantially as hereinbefore set forth of compressing bales without removing the bands, which consists in confining the bale against expansion in the direction in which it is banded, compressing the bale in a direction transverse to the direction of the bands, and compressing the bale in the direction in which it is banded.

2. The method substantially as hereinbefore set forth of compressing bales without removing the bands, which consists in confining the bale against expansion in the direction in which it is banded, compressing the bale in a direction transverse to the direction of the bands, confining the bale against expansion in the direction of the last compression, and compressing the bale in the direction in which it is banded to change the direction of expansion.

3. The method substantially as hereinbefore set forth of compressing bales without removing the bands, which consists in confining the bale against expansion in the direction in which it is banded, compressing the bale longitudinally or in the direction of its length, retaining the bale in such compressed form, and compressing the bale in the direction in which it is banded to change the direction of expansion.

4. The method substantially as hereinbefore set forth of compressing bales without removing the bands, which consists in confining the bale against expansion in the direction in which it is banded, compressing the bale longitudinally or in the direction of its length, retaining the bale in such compressed form, compressing it in the direction in which it is banded to change the direction of expansion, and releasing the bale from compression and allowing it to expand in the direction in which it is banded to fill the bands.

5. The method substantially as hereinbefore set forth of compressing bales without removing the bands, which consists in confining the bale against expansion in the direction in which it is banded, compressing the bale in a direction to bring the bands closer together, retaining the bale in such compressed form, compressing it in the direction in which it is banded, and releasing the bale from compression and allowing it to expand to fill the bands.

6. The method substantially as hereinbefore set forth of compressing bales without removing the bands, which consists in pressing the bale in the direction of its last pressure, confining it against expansion in the direction in which it is banded, compressing it in a direction transverse to the direction in which it is banded, retaining it in such compressed form, compressing it in the direction in which it is banded to change the direction of expansion, and releasing it from compression and allowing it to expand to fill the bands.

7. The method substantially as hereinbefore set forth of compressing bales without removing the bands, which consists in first pressing the bale in the direction in which it is banded, confining it against expansion in the direction in which it is banded, compressing it in a direction transverse to the direction of its bands, retaining it in such compressed form, and compressing it in the direction in which it is banded.

In testimony whereof I have signed my name to this specification in the presence of two subscribing witnesses.

SAMUEL J. WEBB.

Witnesses:
F. L. FREEMAN,
W. CLARENCE DUVALL.